United States Patent
Prasad et al.

(10) Patent No.: US 11,941,282 B2
(45) Date of Patent: Mar. 26, 2024

(54) DATA STORAGE DEVICE AND METHOD FOR PROGRESSIVE FADING FOR VIDEO SURVEILLANCE SYSTEMS

(71) Applicant: Western Digital Technologies, Inc., San Jose, CA (US)

(72) Inventors: Rohit Prasad, Karnataka (IN); Ronak Jain, Karnataka (IN)

(73) Assignee: Western Digital Technologies, Inc., San Jose, CA (US)

( * ) Notice: Subject to any disclaimer, the term of this patent is extended or adjusted under 35 U.S.C. 154(b) by 85 days.

(21) Appl. No.: 17/352,874

(22) Filed: Jun. 21, 2021

(65) Prior Publication Data

US 2022/0404998 A1 Dec. 22, 2022

(51) Int. Cl.
*G06F 3/06* (2006.01)
*H04N 7/18* (2006.01)

(52) U.S. Cl.
CPC .......... *G06F 3/0652* (2013.01); *G06F 3/0604* (2013.01); *G06F 3/0679* (2013.01); *H04N 7/18* (2013.01)

(58) Field of Classification Search
CPC ...... G06F 12/0246; G06F 16/51; G06F 16/70; G06F 2212/7201; G06F 3/0608; G06F 3/0652; G06F 3/0679; G06F 3/0604; G06F 16/71; G06F 3/064; H04N 7/18; H04N 5/783; H04N 21/4334; H04N 21/4335; H04N 21/234381; H04N 19/428; H04N 9/8042; H04N 2201/0087; H04N 2201/3335; H04N 2201/33357
See application file for complete search history.

(56) References Cited

U.S. PATENT DOCUMENTS

| | | | |
|---|---|---|---|
| 7,319,485 B2 | 1/2008 | Szolyga et al. | |
| 8,350,907 B1 | 1/2013 | Blanco et al. | |
| 8,780,199 B2 | 7/2014 | Mimar | |
| 9,788,054 B2* | 10/2017 | Kouncar | H04N 5/77 |
| 2004/0183903 A1* | 9/2004 | Pedersen | H04N 7/18 348/143 |
| 2006/0152636 A1* | 7/2006 | Matsukawa | H04N 7/18 348/715 |
| 2014/0192194 A1 | 7/2014 | Bedell et al. | |
| 2017/0353647 A1 | 12/2017 | Cao | |

(Continued)

OTHER PUBLICATIONS

"Flash memory", Jan. 2, 2020, Wikipedia, preserved by the Internet Archive on Jan. 2, 2020, pp. 1-22 http://web.archive.org/web/20200102013521/https://en.wikipedia.org/wiki/Flash_memory (Year: 2022).*

(Continued)

*Primary Examiner* — Curtis James Kortman
(74) *Attorney, Agent, or Firm* — Crowell & Moring LLP

(57) ABSTRACT

A data storage device and method for progressive fading for video surveillance systems are provided. In one embodiment, a data storage device is provided comprising a memory and a controller. The controller is configured to store a plurality of digital video frames in the memory over time; and create free space in the memory by deleting some of the plurality of digital video frames across a plurality of subsets of digital video frames, wherein fewer digital video frames are deleted from a subset stored more recently in time than from a subset stored less recently in time. Other embodiments are provided.

20 Claims, 6 Drawing Sheets

(56) References Cited

U.S. PATENT DOCUMENTS

2019/0158777 A1   5/2019  Mann et al.
2021/0064280 A1*  3/2021  Gunda ................. G11B 27/005

OTHER PUBLICATIONS

International Search Report dated May 12, 2022 for International Application No. PCT/US2022/013833.
Written Opinion dated May 12, 2022 for International Application No. PCT/US2022/013833.
Search Strategy completed May 11, 2022 for International Application No. PCT/US2022/013833.

* cited by examiner

DATA STORAGE DEVICE AND METHOD FOR PROGRESSIVE FADING FOR VIDEO SURVEILLANCE SYSTEMS

BACKGROUND

In video surveillance system, digital video frames captured by a camera are sometimes stored in a loop in memory, where the oldest previously-written video frames are erased to make room to store new video frames. In this way, the memory (sometimes referred to as a circular memory) is like a first-in-first-out (FIFO) queue, where new data is continuously written at one end of the memory, and, once the memory reaches its capacity limit, the oldest-written data is deleted to make space for new, incoming data.

DETAILED DESCRIPTION

Overview

Figure 1A:
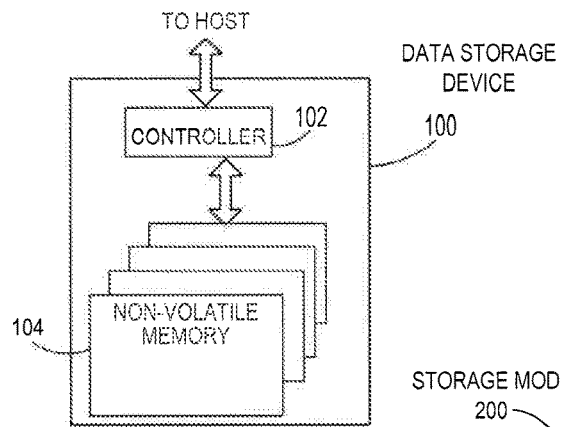
FIG. 1A is a block diagram of a data storage device of an embodiment.

By way of introduction, the below embodiments relate to a data storage device and method for progressive fading for video surveillance systems. In one embodiment, a data storage device is provided comprising a memory and a controller. The controller is configured to store a plurality of digital video frames in the memory over time; and create free space in the memory by deleting some of the plurality of digital video frames across a plurality of subsets of digital video frames, wherein fewer digital video frames are deleted from a subset stored more recently in time than from a subset stored less recently in time.

In some embodiments, the controller is further configured to identify a number of digital video frames to delete from each of the plurality of subsets.

In some embodiments, the controller is further configured to: assign a weight to each of the plurality of subsets; and determine a frequency at which digital video frames are to be deleted from each of the plurality of subsets based on the assigned weights.

In some embodiments, the controller is further configured to create the free space in response to a request from a host.

In some embodiments, the controller is further configured to: determine whether a fading provision feature is enabled; and create the free space in response to determining that the fading provision feature is enabled.

In some embodiments, the controller is further configured to delete some of the plurality of digital video frames serially as they are logically stored in the memory starting from an oldest-written digital video frame in response to determining that the fading provision feature is not enabled.

In some embodiments, the controller is further configured to update a frame map identifying which of the plurality of digital video frames to play after the free space has been created.

In some embodiments, the controller is further configured to store additional digital video frames in the created free space.

In some embodiments, the plurality of digital video frames comprises a surveillance video.

In some embodiments, the memory comprises a three-dimensional memory.

In another embodiment, a method is provided that is performed in a data storage device comprising a memory. The method comprises: storing a plurality of logical blocks in the memory; identifying a number of logical blocks to delete from the memory; identifying a frequency at which the number of logical blocks are to be deleted across a plurality of subsets of the plurality of logical blocks; and deleting the identified number of logical blocks across the plurality of subsets of logical blocks at the identified frequency.

In some embodiments, the plurality of logical blocks comprises a plurality of digital video frames.

In some embodiments, the plurality of digital video frames comprise a surveillance video.

In some embodiments, the method further comprises assigning a weight to each of the plurality of subsets, wherein the frequency is identified based on the assigned weights.

In some embodiments, the deleting is in response to a request from a host.

In some embodiments, the method further comprises determining whether a fading provision feature is enabled, wherein the deleting is in response to determining that the fading provision feature is enabled.

In some embodiments, the method further comprises deleting some of the plurality of logical blocks serially as they are logically stored in the memory starting from an oldest-written logical block in response to determining that the fading provision feature is not enabled.

In some embodiments, the method further comprises updating a map identifying which of the plurality of logical blocks to play.

In some embodiments, the method further comprises storing additional logical blocks in free space created by the deleting.

In another embodiment, a data storage device is provided comprising: a memory; means for storing a plurality of digital video frames in the memory over time; and means for creating free space in the memory by deleting some of the plurality of digital video frames across a plurality of subsets of digital video frames, wherein fewer digital video frames are deleted from a subset stored more recently in time than from a subset stored less recently in time.

Other embodiments are possible, and each of the embodiments can be used alone or together in combination. Accordingly, various embodiments will now be described with reference to the attached drawings.

EMBODIMENTS

The following embodiments relate to a data storage device (DSD). As used herein, a "data storage device" refers to a device that stores data. Examples of DSDs include, but are not limited to, hard disk drives (HDDs), solid state drives (SSDs), tape drives, hybrid drives, etc. Details of example DSDs are provided below.

Figure 1B:
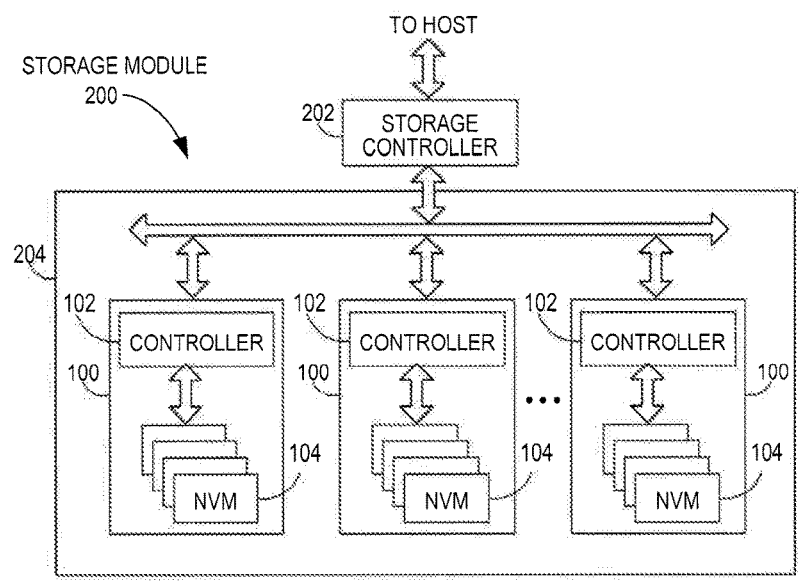
FIG. 1B is a block diagram illustrating a storage module of an embodiment.
Figure 1C:
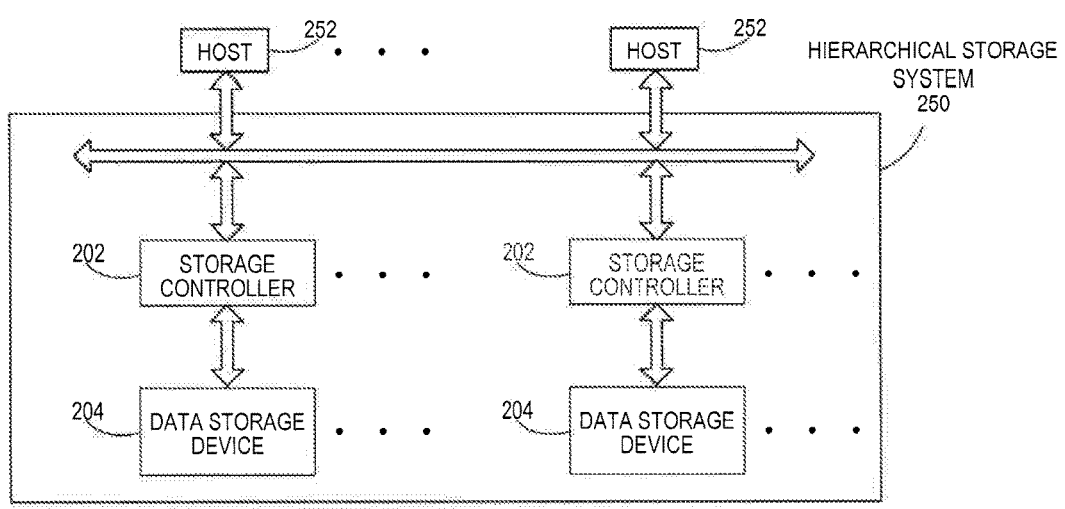
FIG. 1C is a block diagram illustrating a hierarchical storage system of an embodiment.

Data storage devices suitable for use in implementing aspects of these embodiments are shown in FIGS. 1A-1C. FIG. 1A is a block diagram illustrating a data storage device 100 according to an embodiment of the subject matter described herein. Referring to FIG. 1A, data storage device 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
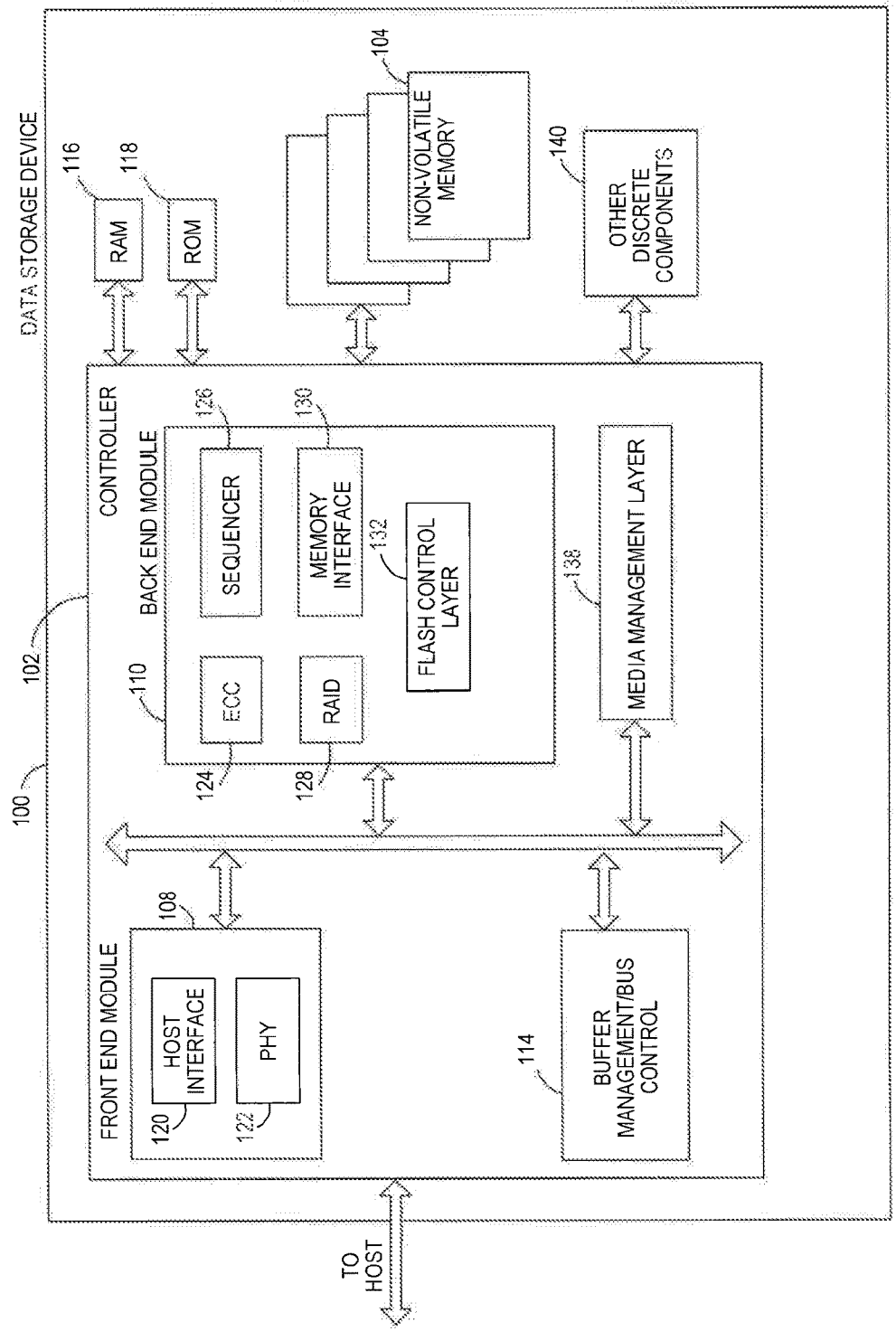
FIG. 2A is a block diagram illustrating components of the controller of the data storage device illustrated in FIG. 1A according to an embodiment.

FIG. 2A is a block diagram illustrating components of controller 102 in more detail. Controller 102 includes a front-end module 108 that interfaces with a host, a back-end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Also, "means" for performing a function can be implemented with at least any of the structure noted herein for the controller and can be pure hardware or a combination of hardware and computer-readable program code.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
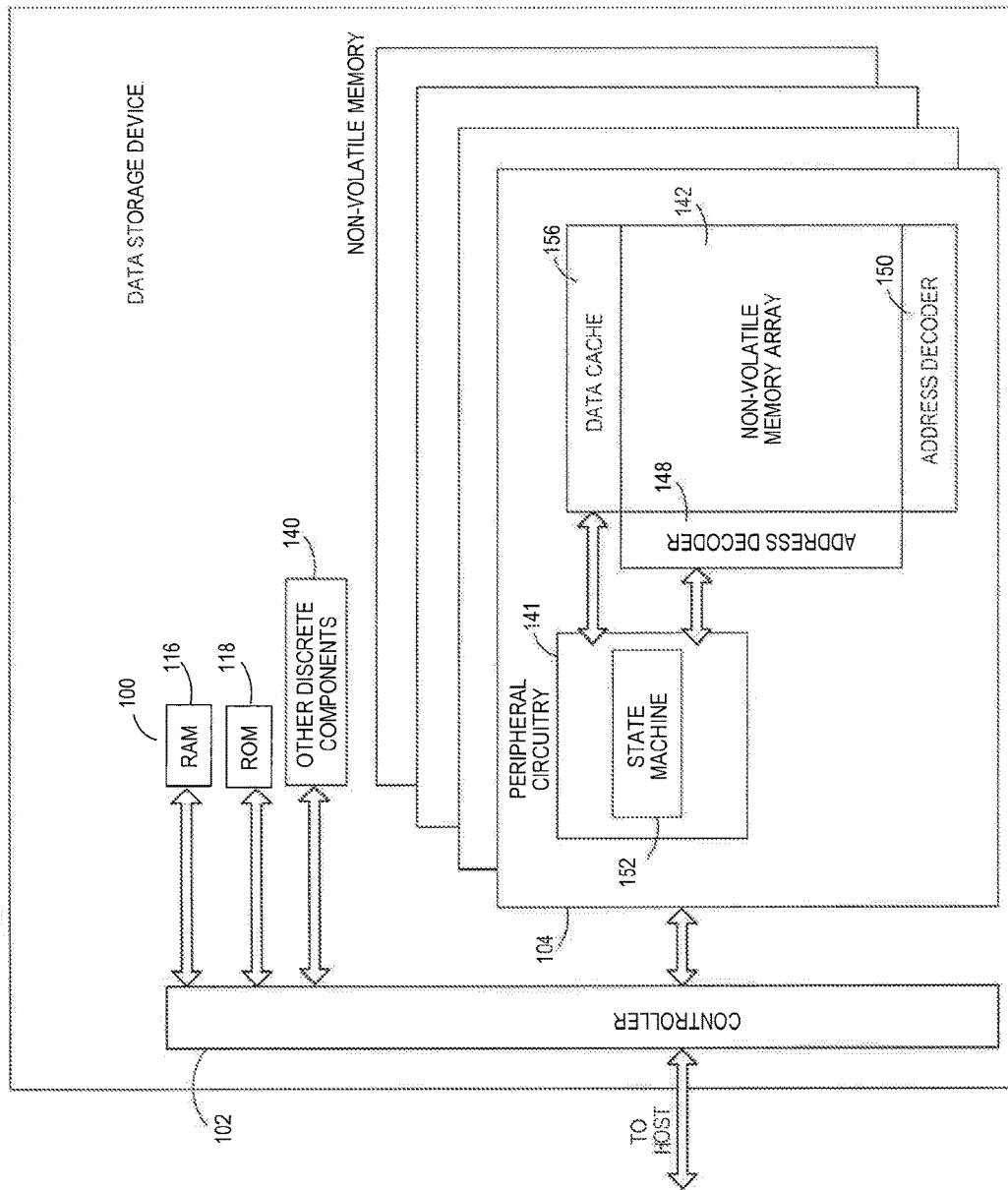
FIG. 2B is a block diagram illustrating components of the memory data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
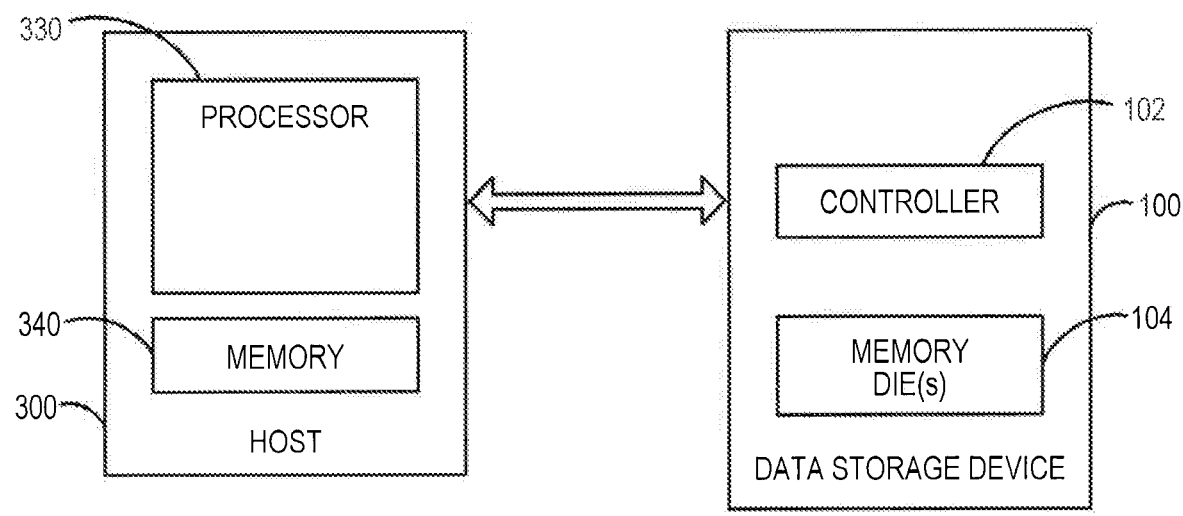
FIG. 3 is a block diagram of a host and data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340. In one embodiment, computer-readable program code stored in the host memory 340 configures the host processor 330 to perform the acts described herein. So, actions performed by the host 300 are sometimes referred to herein as being performed by an application (computer-readable program code) run on the host 300.

As mentioned above, in video surveillance systems, digital video frames captured by a camera are sometimes stored as a loop recording in memory, where the oldest previously-written digital video frames are erased to make room to store new digital video frames. In this way, the memory (sometimes referred to as a circular memory or buffer) is like a first-in-first-out (FIFO) queue, where new data is continuously written at one end of the memory, and, once the memory reaches its capacity limit, the oldest (i.e., first-written) video data is deleted to make space for new incoming data. Once the oldest video data is deleted, there is no way to retrieve that video data, in whole or in part.

The following embodiments provide a mechanism for partially deleting ("fading") digital video data from a memory (e.g., the non-volatile memory 104 or volatile memory (e.g., RAM 116)) of the data storage device 100. In these embodiments, instead of completely erasing old video data from the memory, the controller 102 of the data storage device 100 erases some, but not all, of the digital video frames stored in the memory. By doing so, the "faded" video frames can still be played back, albeit at a lower quality (i.e., at a lower frame rate). In this way, as new video data (e.g., from a loop recording) is stored in the memory, the quality of previously-written video data (e.g., the oldest video data in the memory) decreases, but the data is still available to be played. In one particular example, a mathematical model is provided to mark video frames as redundant based on the distance between the date of creation and the current time. Also, while the below examples use digital video frames (and, in particular, frames of a surveillance video) to illustrate one embodiment, it should be noted that these embodiments can be used with non-surveillance videos, as well as with other (non-video) data (e.g., audio, text, etc.) stored in logical blocks in the memory 104.

Figure 4:
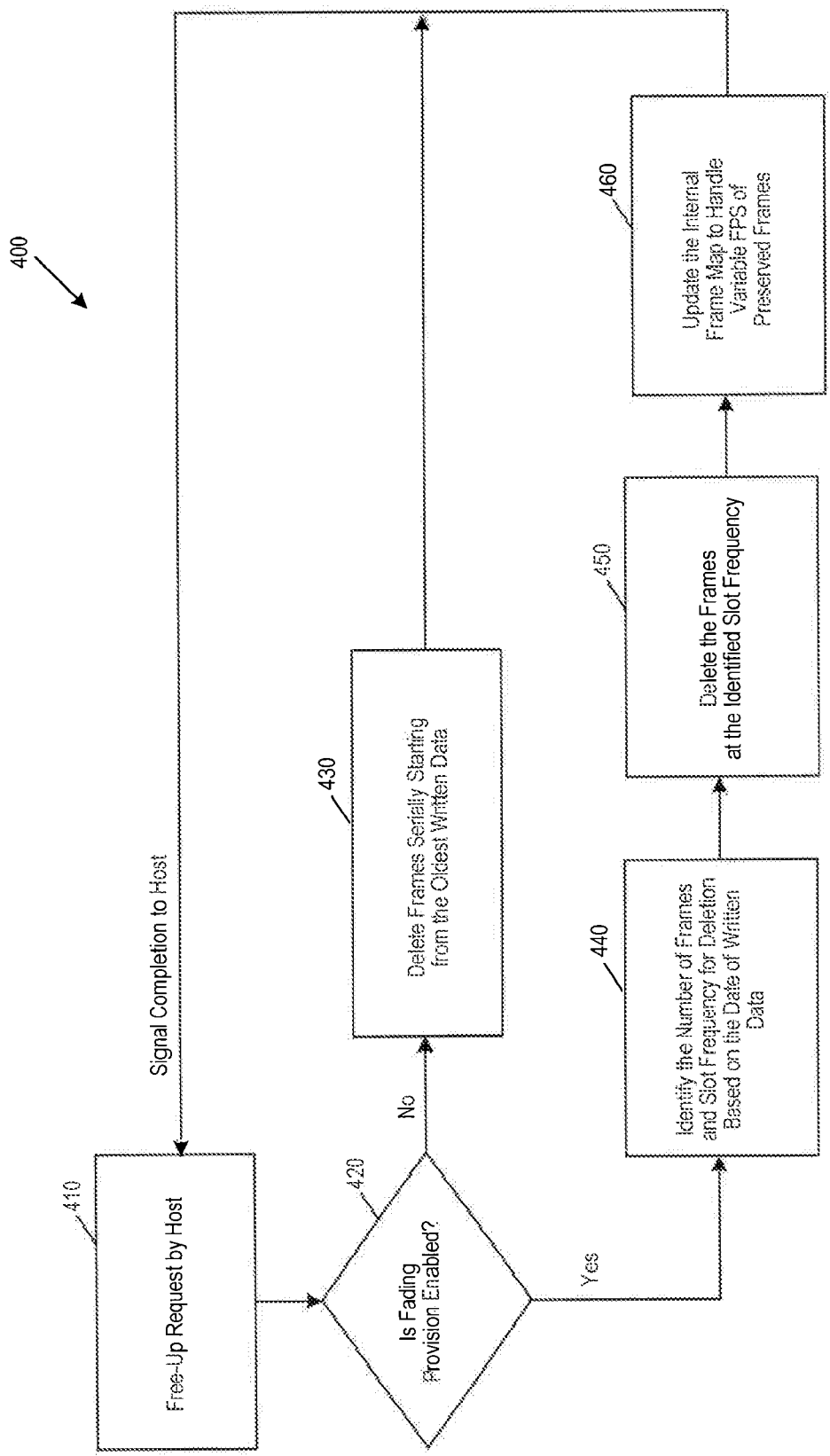
FIG. 4 is a flow chart of a method of an embodiment for progressive fading of video data.

Turning again to the drawings, FIG. 4 is a flow chart 400 of a method of an embodiment. This method is used after the controller 102 of the data storage device 100 stores a plurality of digital video frames in the memory over time. As shown in FIG. 4, the fading process of this embodiment is triggered when the host 300 sends a free-up request to the data storage device 100 (act 410). In other embodiments, the controller 102 can determine when to create free space in the memory, or another trigger can be used.

Next, the controller 102 determines if a fading provision is enabled in the data storage device 100 (act 420). If the fading provision is not enabled, the controller 102 deletes some of the plurality of digital video frames serially as they are logically stored in the memory starting from an oldest-written digital video frame (act 430). However, if the fading provision is enabled, the controller 102 create free space in the memory by deleting some of the plurality of digital video frames across a plurality of subsets of digital video frames, where fewer digital video frames are deleted from a subset stored more recently in time than from a subset stored less recently in time. In this particular example, the controller 102 does this by identifying a number of digital video frames to delete from each of the plurality of subsets (sometimes referred to herein as "slots") of the stored digital video frames and assigns a weight to each of the plurality of subsets. The controller 102 then determines a frequency at which digital video frames are to be deleted from each of the plurality of subsets based on the assigned weights (act 440).

Finally, the controller 102 deletes the identified number of frames at the identified slot frequency (act 450) and updates an internal frame map to handle the variable frames-per-second (FPS) of the preserved frames (act 460). With this map, the controller 102 can identify which of the remaining plurality of digital video frames to play after the free space has been created. The controller 102 can also store additional digital video frames or other data in the created free space.

The following paragraphs provide a mathematical model that can be used to perform the above method. It should be noted that this is merely an example and that other techniques can be used. Accordingly, the details of this model should not be read into the claims unless expressly recited therein.

In this example, a mathematical model is used to identify which data (e.g., frames in case of a video surveillance device) to delete and at what intervals so as to preserve some past data (with reduced quality). The underlying principle is that the older the data written is, the lesser the quality should be. The quality referred to here is not the image quality of the individual frame but rather how "smooth" the transition is between two continuous frames.

As a comparison, consider a technique where every alternate frame is considered redundant and deleted. In this technique, data written two days ago and data written two hours ago would be of equal importance, which is not the case in situations where data is less significant the older it is.

Consider the memory in the data storage device 100 to be one big queue ranging from logical block address (LBA) 0 to LBA (maxLBA−1). Depending on where a frame is stored in this queue, weights and the frequency at which frames can be deleted are assigned (e.g., delete every alternate frame for the first 10 slots, then delete every third frame for the next 9 slots, then next delete every fourth frame for next 8 slots, etc.) The number of slots can be devised dynamically depending on how much free space is requested by the host 300.

Depending on the frame size, the host 300 can decide that "T" number of frames are to be deleted, and n is the frequency factor for the latest data (i.e., every nth frame to be deleted), as follows:

$$\frac{n(n+1)}{2} - 1 \geq T$$

The "−1" is added because the frame deletion frequency is started from two. The solution to this would yield the value of n as:

$$n = \left\lceil \frac{-1}{2} + \frac{\sqrt{9 + 8T}}{2} \right\rceil + 1$$

Here, n is the final frame deletion frequency. To find out how many frames need to iterate in the queue to actually reach this frequency, the controller 102 can assign each frequency a weight depending on where the frame is located from the start of the queue, as those factors are indirectly (i.e., the farther the frame is from the queue (the older the written data is), the higher the weight that is assigned. So, the total frames to be iterated is:

$$\sum_{i=2}^{n} i(n - i + 1)$$

Where n is the solution obtained as per the above equation.

Figure 5:
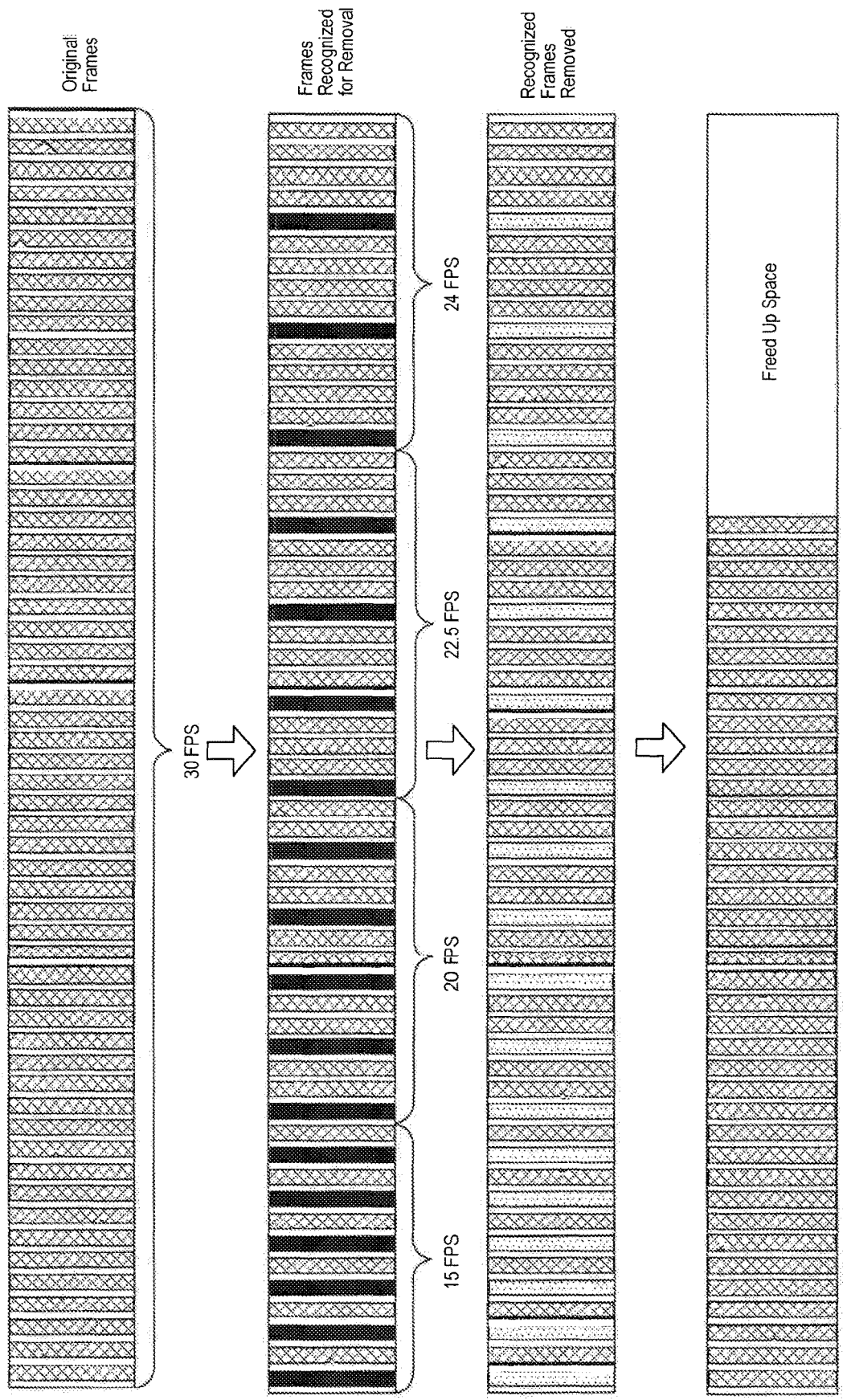
FIG. 5 is an illustration of a progressive fading process of video data of an embodiment.

FIG. 5 is an illustration of the results of using this example method. Generally, video surveillance devices record and store data/frames at an average frame rate of 30 frames per second (FPS). As shown in FIG. 5, initially all data is stored at a frame rate of 30 FPS. Once there is a request to free up space from the host 300, depending on the position of the frame in the storage space, the frequency of the slot is determined. For the first slot, every second frame is deleted. This is done six times, reducing the effective frame rate to 15 FPS. For the next slot, every third frame is deleted, and this is done five times, reducing the effective frame rate to 20 FPS. For the next slot, every fourth frame is deleted, and this is done four times, reducing the effective frame rate to 22.5 FPS, and so on.

As is shown by this example, free space is created without completely deleting any old data. The amount of data to be removed can be calculated by calculating against the incoming data by the host 300. By this method, the old data can still be maintained but, with each pass, its quality decreases.

There are several advantages associated with these embodiments. For example, these embodiments do not delete entire subsets of old data right away; rather, the quality of a subset gradually decreases (fades) over time. In the case of surveillance video, the initial decrease in frame rate should not matter much. Also, these embodiments are configurable to the start offsets and strides that it needs to take. The offsets and strides can be both configurable (e.g., by the user) or can be learned based on the frequency with which a user views the video.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two-dimensional configuration, e.g., in an x-z plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two-dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two-dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
    a memory; and
    a controller configured to:
        store a plurality of digital video frames in the memory over time, wherein all of the digital video frames of the plurality of digital video frames are initially stored for playback at a same frame rate;
        each time a free-up request is received from a host to create free space to store additional digital video frames:
            calculate a number of digital video frames to be deleted from the memory based on an amount of incoming data from the host;
            respectively identify a plurality of progressively-higher frequencies of digital video frame deletion for a plurality of subsets the plurality of digital video frames, wherein the plurality of subsets of the plurality of digital video frames are stored in time order and the frequency of digital video frame deletion of a given subset of the plurality of subsets of the plurality of digital video frames is higher than the frequency of digital video frame deletion of a subset of the plurality of subsets of the plurality of digital video frames that is stored earlier in the time order; and
            delete the calculated number of digital video frames by deleting digital video frames from each subset of the plurality of subsets of the plurality of digital video frames at its identified frequency of digital video frame deletion; and
        store the additional digital video frames in free space in the memory created by the deleting of the calculated number of digital video frames.

2. The data storage device of claim 1, wherein the controller is further configured to update a frame map identifying which frames of the plurality of digital video frames to play after the calculated number of digital video frames has been deleted.

3. The data storage device of claim 2, wherein the controller is further configured to:
    use the frame map to identify which digital video frames to play.

4. The data storage device of claim 3, wherein the controller is further configured to play the identified digital video frames.

5. The data storage device of claim 1, wherein the plurality of digital video frames comprises a surveillance video.

6. The data storage device of claim 1, wherein the memory comprises a three-dimensional memory.

7. The data storage device of claim 1, wherein the controller is further configured to dynamically determine a number of subsets in the plurality of subsets of the plurality of digital video frames based on the calculated number of digital video frames to be deleted.

8. The data storage device of claim 1, wherein the host comprises a computer.

9. The data storage device of claim 1, wherein the host comprises a mobile phone.

10. The data storage device of claim 1, wherein the host comprises a tablet.

11. The data storage device of claim 1, wherein the host comprises a wearable device.

12. The data storage device of claim 1, wherein the host comprises a digital video recorder.

13. The data storage device of claim 1, wherein the host comprises a surveillance system.

14. A method comprising:
    performing the following in a data storage device comprising a memory:
        storing a plurality of digital video frames in the memory over time, wherein all of the digital video frames of the plurality of digital video frames are initially stored for playback at a same frame rate;
        each time a free-up request is received from a host to create free space to store additional digital video frames:
            calculating a number of digital video frames to be deleted from the memory based on an amount of incoming data from the host;
            respectively identifying a plurality of progressively-higher frequencies of digital video frame deletion for a plurality of subsets of the plurality of digital video frames, wherein the plurality of subsets of the plurality of digital video frames are stored in time order and the frequency of digital video frame deletion of a given subset of the plurality of subsets of the plurality of digital video frames is higher than the frequency of digital video frame deletion of a subset of the plurality of subsets of the plurality of digital video frames that is stored earlier in the time order; and
            deleting the calculated number of digital video frames by deleting digital video frames from each subset of the plurality of subsets of the plurality of digital video frames at its identified frequency of digital video frame deletion; and
        storing the additional digital video frames in free space in the memory created by the deleting of the calculated number of digital video frames.

15. The method of claim 14, wherein the plurality of digital video frames comprises a surveillance video.

16. The method of claim 14, further comprising updating a frame map identifying which frames of the plurality of digital video frames to play after the calculated number of digital video frames has been deleted.

17. The method of claim 16, further comprising:
    using the frame map to identify which digital video frames to play.

18. The method of claim 17, further comprising playing the identified digital video frames.

19. The method of claim 14, further comprising determining a number of subsets in the plurality of subsets of the plurality of digital video frames based on the calculated number of digital video frames to be deleted.

20. A data storage device comprising:
    a memory;

means for storing a plurality of digital video frames in the memory over time, wherein all of the digital video frames of the plurality of digital video frames are initially stored for playback at a same frame rate;

means for performing the following each time a free-up request is received from a host to create free space to store additional digital video frames:

calculating a number of digital video frames to be deleted from the memory based on an amount of incoming data from the host;

respectively identifying a plurality of progressively-higher frequencies of digital video frame deletion for a plurality of subsets of the plurality of digital video frames, wherein the plurality of subsets of the plurality of digital video frames are stored in time order and the frequency of digital video frame deletion of a given subset of the plurality of subsets of the plurality of digital video frames is higher than the frequency of digital video frame deletion of a subset of the plurality of subsets of the plurality of digital video frames that is stored earlier in the time order; and deleting the calculated number of digital video frames by deleting digital video frames from each of the plurality of subsets of the plurality of digital video frames at its identified frequency of digital video frame deletion; and means for storing the additional digital video frames in free space in the memory created by the deleting of the calculated number of digital video frames.

\* \* \* \* \*